United States Patent [19]

Thomson

[11] Patent Number: 5,496,502
[45] Date of Patent: Mar. 5, 1996

[54] ADHESIVE PLASTIC SCINTILLATOR

[75] Inventor: James Thomson, Groningen, Netherlands

[73] Assignee: Packard Instrument, B.V., Gtoningen, Netherlands

[21] Appl. No.: 342,440

[22] Filed: Nov. 18, 1994

Related U.S. Application Data

[63] Continuation-in-part of Ser. No. 78,142, Jun. 16, 1993, abandoned.

[51] Int. Cl.⁶ ............................ C09K 11/06; G01T 1/203
[52] U.S. Cl. .................. 252/301.17; 252/301.35; 250/361 R; 250/483.1; 250/428; 356/246
[58] Field of Search .............. 252/301.17, 301.35; 250/361 R, 483.1, 428; 356/246; 422/99

[56] References Cited

U.S. PATENT DOCUMENTS

| | | |
|---|---|---|
| 2,745,967 | 5/1956 | Ludeman . |
| 2,750,514 | 6/1956 | Armistead . |
| 3,134,018 | 5/1964 | Schranz . |
| 3,246,195 | 4/1966 | Hoshino et al. . |
| 3,356,616 | 12/1967 | Sandler et al. . |
| 3,418,127 | 12/1968 | Millikan . |
| 3,418,152 | 12/1968 | Staudenmayer . |
| 3,536,914 | 10/1970 | Chapman . |
| 3,542,588 | 11/1970 | Heidbrink et al. . |
| 3,594,217 | 7/1971 | Seybert et al. . |
| 3,649,464 | 3/1972 | Freeman . |
| 3,676,360 | 7/1972 | Shamoo . |
| 3,758,412 | 9/1973 | Grum . |
| 3,853,584 | 12/1974 | Tatsuta et al. . |
| 3,857,036 | 12/1974 | Novak .................................. 250/367 |
| 3,898,457 | 8/1975 | Packard et al. ...................... 250/303 |
| 3,924,128 | 12/1975 | Frank .................................. 250/328 |
| 3,928,227 | 12/1975 | Sena et al. . |
| 3,939,094 | 2/1976 | Kauffman . |
| 4,138,336 | 2/1979 | Mendel . |
| 4,154,795 | 5/1979 | Thorne . |

(List continued on next page.)

FOREIGN PATENT DOCUMENTS

| | | |
|---|---|---|
| 0070686 | 7/1982 | European Pat. Off. . |
| 0114941 | 8/1984 | European Pat. Off. . |
| 0185494 | 6/1985 | European Pat. Off. . |
| 0174744 | 8/1985 | European Pat. Off. . |
| 0203048 | 5/1986 | European Pat. Off. . |
| 2359422 | of 1977 | France . |
| 1241001 | 5/1963 | Germany . |
| 1955335 | 11/1969 | Germany . |
| 232072A1 | 7/1984 | Germany . |
| 56-25470 | 6/1981 | Japan . |
| 56-132583A | 10/1981 | Japan . |
| 57-146178A | 9/1982 | Japan . |
| 62-290789 | 12/1987 | Japan . |
| WO90/06526 | 12/1989 | WIPO . |
| WO89/12838 | 12/1989 | WIPO . |
| WO90/11524 | 3/1990 | WIPO . |

OTHER PUBLICATIONS

Scintillation counting composition and elements, Research Disclosure, 1977, pp. 43–46 (month unknown).

Bollinger, et al., A Simple Gelation Procedure for Liquid Scintillation Counting, Analycial Chemistry, vol. 39, No. 12, pp. 1508–1509, Oct., 1967 (month unknown).

(List continued on next page.)

*Primary Examiner*—Prince Willis, Jr.
*Assistant Examiner*—Alan D. Diamond
*Attorney, Agent, or Firm*—Arnold, White & Durkee

[57] ABSTRACT

An adhesive plastic scintillator which can be attached onto a solid support medium such as a microtiter plate, either by melting it in and/or on a solid support medium because the plastic scintillator is capable of being changed between solid and liquid phases, whichever is desired, by temperature control, or by deposition from a solution of said adhesive plastic scintillator. The plastic scintillator is for analyzing radioactive samples and comprises fluorescent substances and optionally energy transfer compounds for converting radiation energy into light energy. The plastic scintillator remains transparent upon transition from the liquid to the solid state, and upon the same transition adheres to the solid support medium.

23 Claims, 4 Drawing Sheets

U.S. PATENT DOCUMENTS

| | | | |
|---|---|---|---|
| 4,262,206 | 4/1981 | Viehmann | 250/483 |
| 4,275,300 | 6/1981 | Abbott | 250/304 |
| 4,276,259 | 6/1981 | Eibl et al. | |
| 4,292,272 | 9/1981 | Kitajima et al. | |
| 4,298,796 | 11/1981 | Warner et al. | 250/328 |
| 4,358,401 | 11/1982 | O'Brien et al. | 252/628 |
| 4,372,941 | 2/1983 | Ryan | |
| 4,375,423 | 3/1983 | Cusano et al. | 252/301.36 |
| 4,396,528 | 8/1983 | Abbott | 252/301.17 |
| 4,488,046 | 12/1984 | Bernstein | 250/474.1 |
| 4,493,815 | 1/1985 | Fernwood et al. | 422/101 |
| 4,495,084 | 1/1985 | Shimizu et al. | 252/301.17 |
| 4,520,110 | 5/1985 | Stryer et al. | 436/501 |
| 4,624,799 | 11/1986 | Hegge et al. | 252/301.17 |
| 4,657,696 | 4/1987 | Thomson | 252/301.17 |
| 4,728,792 | 3/1988 | Warner et al. | 250/328 |
| 4,754,138 | 6/1988 | Edelstein et al. | 250/328 |
| 4,764,677 | 8/1988 | Spurney | 250/361 |
| 4,828,386 | 5/1989 | Matkovich et al. | 356/246 |
| 4,832,917 | 5/1989 | Elliott | 422/102 |
| 4,916,320 | 4/1990 | Wunderly et al. | 250/483.1 |
| 4,933,554 | 6/1990 | Lehtinen et al. | |
| 4,972,084 | 11/1990 | Potter et al. | 250/361 R |
| 5,043,581 | 8/1991 | Joss | 250/328 |
| 5,243,193 | 9/1993 | Suontausta et al. | 252/301.17 |
| 5,294,795 | 3/1994 | Lehtinen et al. | |
| 5,298,753 | 3/1994 | Sonne et al. | |
| 5,319,436 | 6/1994 | Manns et al. | 356/246 |

OTHER PUBLICATIONS

O'Conner, et al., Difficulties in Counting Emulsions of $^3H$ and $^{14}C$ Labelled Biomolecules, Liquid Scintillation Counting Recent Applications and Development, vol. II., pp. 245–258 (1980) (month unknown).

Bonner, et al., Efficient Fluorography of $^3H$ and $^{14}C$ on Thin Layers, Analytical Biochemistry 89, pp. 247–256 (1978) (month unknown).

Influence of Polystyrene Excimers on the Excitation Energy Transfer in Solid Scintillating Solutions, Journal of Polymer Science: Polymer Physics Edition, vol. 22, pp. 2275–2278 (1984) (month unknown).

Benakis, A New Gelifying Agent in Liquid Scintillation Counting, pp. 735–745 (Date Unknown).

Gupta, New Method of Micro–Liquid Scintillation Counting in Plastic Minibags for $H^3$, $C^{14}$, $S^{35}$ and $P^{32}$ Samples, pp. 747–752 (Date Unknown).

Lupica, Polyethoxylated Nonionic Surfactants in Toluene for Liquid Scintillation Counting of Tritium in Aqueous Samples, International Journal of Applied Radiation and Isotopes, 1970, vol. 21, pp. 487–490 (month unknown).

Chase, et al., Principles of Radioisotope Methodology, Third Edition, pp. 301–302 (Date Unknown).

Potter, et al., Scintillation Counting of Harvested Biological Samples with low–energy beta emitters, using solid–scintillant–filters, pp. 1–20 (Date Unknown).

Christophorou, Improved Organic Scintillators in 2–Ethyl Naphthalene, Nature, vol. 212, pp. 816–818, Nov. 17, 1966.

Meyer, et al., A New Liquid Scintillator, Nuclear Instruments and Methods, vol. 22, Nov., 1962 pp. 371–372.

Yamakoshi, Kerosine Scintillator, Nuclear Instruments and Methods, vol. 126, pp. 407–412, Oct., 1974.

ADHESIVE PLASTIC SCINTILLATOR

REFERENCES

This application is a continuation-in-part of U.S. patent application Ser. No. 08/078,142 filed on Jun. 16, 1993 now abandoned.

FIELD OF THE INVENTION

The present-invention relates to scintillation counting and more particularly to the integration of a plastic scintillator onto a support medium, especially a microtiter plate.

BACKGROUND OF THE INVENTION

Liquid scintillation counting and automated instruments known as liquid scintillation counters are widely utilized to analyze samples containing radioactively labelled substances.

Typically, a sample in solution is mixed with a liquid scintillator, commonly referred to as a cocktail, and the light events produced from the sample and cocktail mixture are detected according to their energy and number of events. The light events occur when the energy of the particles, emitted from the radioactive isotope component of the sample in solution, is transferred to the molecules of liquid scintillator. This produces a light emission of a specific energy range which is characteristic of the radioactive isotope.

Detecting both the energy and number of light events in a particular energy range provides the information necessary to construct a spectrum. Using this information the radioactive species can be quantitatively analyzed. Liquid scintillation counting and automated instruments to perform liquid scintillation counting have been widely discussed in a multitude of publications and patents.

Scintillation counting of liquid samples has certain disadvantages attributable to the nature of the liquid solution used. One is a phenomenon known as quench. Quench commonly refers to an effect in the scintillation process of a chemical or optical nature which results in loss of light events or reduction in light emission energy. The chemical nature of the solution in which the sample and scintillator are mixed and the color of the liquid sample solution are the causative agents. The result is inefficiency in the ability of the liquid scintillation counter to accurately count the particle disintegrations of the isotopes, and therefore interference with sample analysis.

Another disadvantage is that after analysis the liquid produced by mixing the radioactive sample with the cocktail must be disposed of. The regulations and controls governing the disposal of liquid radioactive materials are particularly rigorous. Due to the volume of liquid radioactive materials that require disposal of, the costs can be considerable.

In many cases a solid material having a radioactive nature is easier to dispose of and incurs less expense. Plastics are often used as such solid scintillation materials and previously mentioned in the literature are the thermosetting plastics which include polystyrene, polyvinyltoluene, various acrylic polymers and copolymers. The following patents further illustrate the use of plastics as scintillation materials.

U.S. Pat. No. 3,010,908 issued Nov. 28, 1961, discloses the use of dialkylstyrene polymers as the primary absorber in a solid solution scintillation counting composition.

U.S. Pat. Nos. 2,985,593 and 3,356,616 disclose styrene-derived monomers polymerized or copolymerized with vinyl or methacrylate monomers to form the solvent for a solid solution scintillation counting composition.

U.S. Pat. No. 3,457,180 issued July 1969 discloses as the solvent for a solid solution scintillator copolymerized paravinyltoluene and methylmethacrylate.

U.S. Pat. No. 3,513,102 discloses a fluorescent coating in which a fluor and a copolymer of an acrylate and styrene are dissolved in an organic solvent, and the solution is emulsified in an aqueous dispersion of a hydrophilic colloid. The copolymer is not derived from a latex, but is a solution polymer isolated, redissolved and blended by high-speed milling for dispersion in a gel binder.

U.S. Pat. No. 3,886,082 issued May 27, 1975 discloses an example of one such plastic scintillator material. The scintillator employs acrylic polymers and copolymers as the host plastic and bis(O-methylstyryl)-benzene, perylene, tetraphenyl-butadiene, diphenyl anthracene, bis(-phenyloxazolyl benzene) and dimethyl bis(phenyl oxazolyl benzene) as the fluorescent additive.

U.S. Pat. No. 4,180,479 issued Dec. 25, 1979 discloses the use of various stilbene derivatives as fluorescent agents in scintillators.

U.S. Pat. No. 4,495,084 discloses plastic scintillators in which a scintillating substance is incorporated into a matrix resin which comprises a copolymer of a styrene type compound and various unsaturated copolymers including unsaturated esters.

U.S. Pat. No. 3,068,178 discloses plastic scintillators based on polystyrene and polyvinyltoluene.

More recently there have been further advances in the field of solid scintillators.

U.S. Pat. No. 4,713,198 describes the preparation of a polymethylpentene thermoplastic scintillator capable of functioning at high temperatures.

International Patent application WO 90/16002 describes a detection material that is solid at room temperature but optionally meltable to fluid. This material is composed of a low molecular weight plastic, a hot melt copolymer and a paraffin wax.

U.S. patent application Ser. No. 07/499,434 refers to a solid-liquid reversible scintillator used for solid support sample counting. This scintillator is composed of fluors, paraffin and p-xylene and is fluid above 40° C. but reverts to a translucent waxy solid upon cooling.

French Patent No. 1,590,762 describes the use of polyolefin resins and solvents to form gels which can be used as scintillation materials. These materials are solid-liquid reversible.

International Patent application WO 89/02088 describes the use of an inorganic solid scintillator which is attached to a solid support medium by a binder material.

U.S. Pat. No. 4,692,266 issued Sep. 8, 1987 describes a dry solid scintillator counting composition for the detection of radiative substances in a liquid.

U.S. Pat. No. 3,491,235 describes a method for producing fluorescent layers by dispersing organic solution of fluorescent compounds in aqueous colloid solution, coating and drying.

Japanese Patent Publication Sho 63-101787 describes multi-layer scintillators made by piling up either mixed monomolecular films consisting of radiation absorbing compounds and compounds emitting ultraviolet, visible or infrared radiation, or monomolecular films consisting of radiation absorbing compounds and separate monomolecular films consisting of compounds emitting ultraviolet, visible or infrared radiation. The layers are deposited from a solution of the compounds in chloroform.

U.S. Pat. No. 4,258,001 describes an element for analysis or transport of liquid, which contains a structure comprising a plurality of heat-stable, organo-polymeric particles non-swellable in and impermeable to the liquid, and an adhesive concentrated at particle surface areas contiguous to adjacent particles bonding the particles into a coherent, three-dimensional lattice that is non-swellable in the liquid. Interconnected void spaces among the particles provide for transport of the liquid.

The prior art scintillators have the disadvantage that it is not possible to cohesively bond them onto plastic support media. The plastic support media can be polystyrene, polyvinylchloride, polyethylene, polypropylene, other polyolefins, acrylonitrile copolymers and combinations of these. The plastic support media can also be clear, translucent, white or black or a combination of these. The plastic support media can be fabricated into microplates, petri dishes, culture flasks, test tubes and stand-alone single cups. As well as plastic support media, other media, e.g. glass and metals are suitable host support media. Further disadvantages of the prior art scintillators are that they do not possess the properties necessary for producing a scintillating plastic coating on a solid support medium.

SUMMARY OF THE INVENTION

It is therefore an object of this invention to provide a plastic scintillator which can be attached from a liquid state onto a solid support medium.

It is another object of the present invention to provide a plastic scintillator already attached to a solid support medium for analyzing a wet or dry sample.

It is a further object of this invention to provide a plastic scintillator which can be melted in and/or on (abbreviated herein as melted-in-on) a solid support medium.

It is a further object of this invention to provide a plastic scintillator which is capable of becoming fluid at a temperature low enough to prevent distortion of the solid support medium.

It is a still further object of this invention to provide a plastic scintillator which acts as a hot melt adhesive.

A still further object of this invention is to provide a plastic scintillator which remains transparent upon transition from liquid to solid state.

A still further object of this invention is to provide a plastic scintillator which has sufficient solubility for the fluorescent agents and thus demonstrates good scintillation properties.

This invention relates to the use of alpha-methylstyrene polymer or alpha-methylstyrene/vinyltoluene copolymer or a (low molecular weight) styrene polymer to provide the scintillator plastic material which will melt-in-on a solid support medium. In one embodiment of the present invention, the solid support medium is a microplate, and the inside surfaces of the sample wells of the microplate are already coated with the plastic scintillator before introducing samples to be analyzed in the sample wells.

Primary, and optionally, secondary scintillating agents are added to the host plastic such as wavelength shifters and energy transfer compounds.

This invention also relates to a method for producing the plastic scintillator composition, which comprises melting the host plastic, adding and mixing the fluorescent agents and any other additives while the composition is maintained at a temperature above the melting point, and cooling the composition.

Furthermore, the invention relates to a method for producing the melted-in-on plastic scintillator bonded to the solid support medium, and, in one embodiment, the solid support medium is a microtiter plate. This is effected by judicious selection of application temperature which ensures that the solid support medium retains its structural integrity. Additionally, the present invention involves a method of analyzing a sample using the plastic scintillator bound to a solid support medium. In one embodiment, inside surfaces of sample wells in a microtiter plate are already coated with the plastic scintillator before introducing a sample to be analyzed, and the plastic scintillator coating remains solid at least until after the sample is analyzed.

It is a further object of this invention to provide a plastic scintillator which can be attached or bound to a solid support medium from a solution in a suitable solvent.

It is still a further object of the present invention to provide a method of analyzing a wet or dry sample using the plastic scintillator already attached to a solid support medium.

A still further object of the present invention is to provide a microplate with plastic scintillator attached to the inside surfaces of the sample wells for analyzing samples.

It is a further object of this invention to provide a plastic scintillator which is capable of dissolving in suitable solvent media.

A further object of this invention is to provide a method of bonding/attaching the plastic scintillator to a solid support medium by contacting the solid support medium with a solution of the plastic scintillator in a suitable solvent followed by evaporation of the solvent.

Furthermore, the solution of the plastic scintillator may also be applied by spraying, e.g. using conventional spray-can technology.

The solid support medium can be made of plastic or any other suitable material, such as glass or metal. It is also possible to use plastic-coated or metal-coated support medium. In one embodiment, the solid support medium is a microtiter plate, and the plastic scintillator adheres to the inside surfaces of the sample wells and forms a hard surface coating.

This invention further relates to a method for producing the plastic scintillator composition, which comprises dissolving the host plastic, the fluorescing agents and any other additives in a suitable solvent medium.

BRIEF DESCRIPTION OF THE DRAWINGS

Other aspects and advantages of the present invention may become apparent upon reading the following detailed description and upon reference to the drawings in which.

DETAILED DESCRIPTION OF THE PREFERRED EMBODIMENTS

Figure 1:
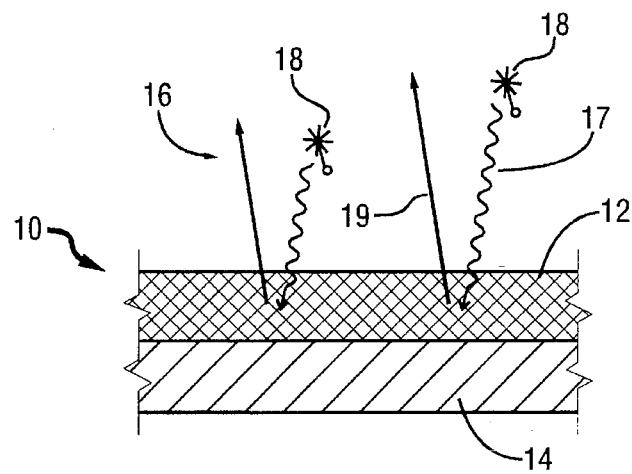
FIG. 1 shows adhesive plastic scintillator attached to a solid support medium according to the principles of the present invention.

As indicated above, this invention relates to plastic scintillators and a method of producing a melted-in-on coating, a coating from solution or a coating from spraying, onto a solid support medium. A further aspect of the present invention involves the plastic scintillator and a method of using the plastic scintillator where the plastic scintillator forms a solid coating attached to the solid support medium before exposing a sample to the plastic scintillator. In a preferred embodiment of the present invention, the solid support medium is a microtiter plate.

According to the present invention it has been found that alpha-methylstyrene/vinyltoluene copolymer finds particular advantage as a plastic scintillator because the material has a desirable melting point (75° C.), retains its transparency upon transition from liquid to solid state, has good scintillation properties, is a hot melt adhesive and is soluble in organic solvents. Alpha-methylstyrene/vinyltoluene copolymer is a known thermoplastic and is available commercially. For example Piccotex 75 is available from Hercules B. V. in The Netherlands.

Examples of suitable alpha-methylstyrene polymers are Kristalex F100 (having a weight-average molecular weight $M_W$ of 1400, a number-average molecular weight $M_N$ of 800 and a Z-average molecular weight $M_Z$ of 2350) and Kristalex F85 ($M_W$=1200, $M_N$= 750 and $M_Z$=1950) from Hercules B. V. in The Netherlands. An example of a suitable low molecular weight styrene polymer is Piccolastic A75 from Hercules B. V. in The Netherlands.

For use in the present invention the plastic scintillator is processed to provide the scintillation properties described. In the method for forming the product of the invention, the plastic of the preferred embodiment is either subjected to an elevated temperature to melt it and form a plastic melt, or dissolved in a suitable solvent medium. Solvents suitable for such a medium include aromatic hydrocarbons, aliphatic hydrocarbons, chlorinated hydrocarbons, ethers, esters and nitroparaffins.

Fluors useful in the successful practice of the present invention include any of the organic fluors well-known in the scintillation counting art which are compatible with the host plastic. Generally, suitable organic fluorescent compounds may be selected, for example, from those described as "organic fluors" and "organic scintillators" in Organic Scintillation Detection, E. Schram and R. Lombaert, Elsevier Publishing Co., 1963. Useful wavelength shifters (i.e. secondary fluors) are also well-known in the scintillation counting art. Preferred among these classes of materials are 2,5-diphenyloxazole (PPO) as the primary fluor and either bi(O-methylstyryl)benzene (bis-MSB) or 9,10-diphenyl-anthracene or 9,10-dimethylanthracene as the secondary fluor. The primary fluor is preferably present in the range 0.01 to 5.0 wt %. The secondary fluor is preferably present in the range 0.001 to 0.5 wt %.

Energy transfer compounds which enhance the scintillation properties are optional and include compounds like mono- and di-alkylnaphthalenes, naphthalene, anthracene, and durene. They are added in the range 0.01 to 15 wt %.

After completion of the addition of fluorescent agents and the optional additives the melt is cooled to room temperature. The plastic scintillator can now be readied for integration onto the solid support medium in various ways. The solid plastic scintillator, which preferably forms a solid solution, can be ground to a fine white powder or granulated into regular size granules. Alternatively, the plastic scintillator can be hot melt extruded and chopped into regular sized pellets. A further alternative, for larger sized solid support media, is to re-melt the plastic scintillator and pour the plastic melt onto or into the support medium.

For small support media, the powdered or granular plastic scintillator is weighed into the desired receptacle and carefully heated to the required temperature which will be specific for each solid support medium. The plastic scintillator is maintained at this temperature for such a period as to ensure that all the plastic scintillator is transformed into a homogeneous melt. Upon cooling to room temperature (about 25° C.), the melted-in-on plastic scintillator is firmly attached to the solid support medium before exposure to the sample to be analyzed.

A yet further alternative is the integration of the plastic scintillator onto the solid support medium using a solution of the plastic scintillator (in the range of from 5 to 80 wt %) in a suitable solvent medium. After dissolving the host plastic, the fluorescent agent and the optional additives in the desired solvent medium, the desired receptacle is filled with the plastic scintillator solution and then emptied again. A layer of plastic scintillator solution remains on the internal surface and as the solvent evaporates, a solid layer of plastic scintillator is attached to the internal surface.

FIG. 1 shows a scintillating solid support medium 10 having a preferably homogeneous plastic scintillator 12 attached or bound to a solid support medium 14 as described above. In accordance with another aspect of the present invention, the plastic scintillator 12 is already attached to the solid support medium 14 when the plastic scintillator 12 is exposed to sample 16. In the illustrated embodiment, the sample 16 includes radiolabeled constituents 18 producing radiation energy which interacts with the plastic scintillator 12. The plastic scintillator 12 converts the radiation energy 17 into light energy 19. Because the scintillating solid support medium 10 can be used with a variety of solid support medium, it is not intended for the light energy to be internally reflected within the solid support medium 14 to propagate along said solid support medium for detection at one end (not shown) of the solid support medium 14. As can be seen from FIG. 1, the plastic scintillator 12 forms a distinct layer between the solid support medium 14 and the sample 16. The layer of plastic scintillator 12 preferably remains solid after application to the solid support medium 14.

Figure 2A:
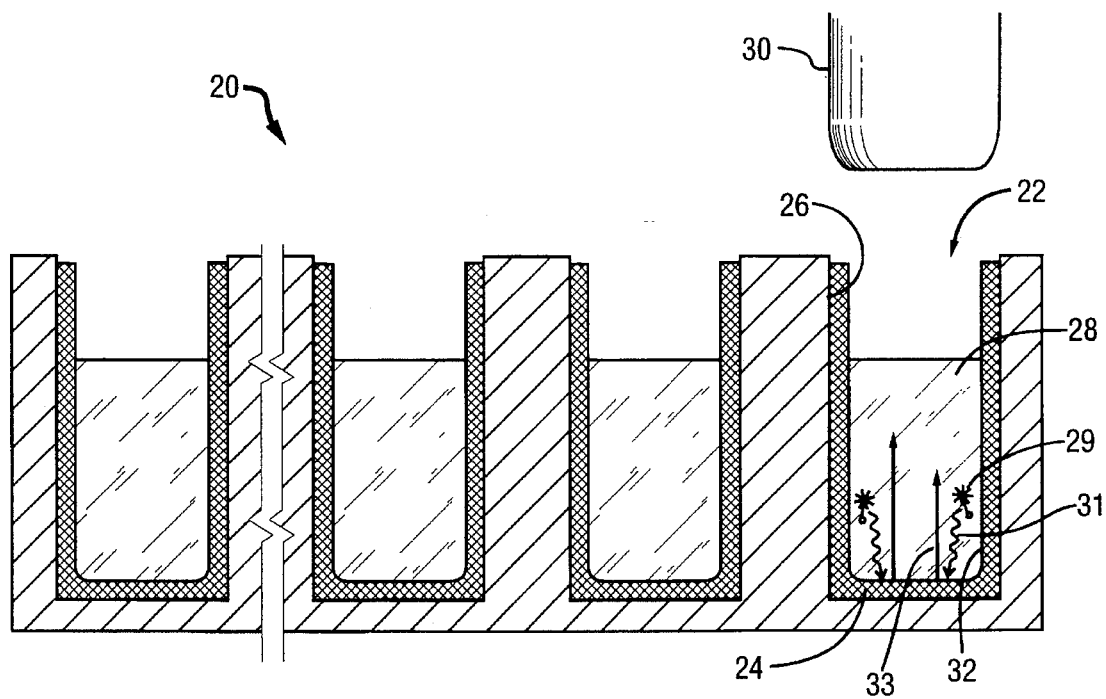
FIGS. 2a and 2b show an adhesive plastic scintillator coating that has been attached to the inside surfaces of the microtiter plate wells before the introduction of samples to be measured according to the principles of the present invention.

In accordance with the principles of the present invention, FIG. 2a shows a scintillating solid support medium in the form of a scintillating microplate 20 having a plurality of sample wells 22 with a solid coating 24 attached to at least portions of the inside surfaces 26 of the sample wells 22. The solid plastic scintillator coating 24 is attached to the microplate 20 before wet or dry samples 28 are introduced into the sample wells 22. Generally, samples 28 are introduced into the sample wells 22 for analysis in a liquid medium. For each sample well 22, the solid coating 26 forms a layer of plastic scintillator between the inside surface of an individual well 22 and the sample 28 to be analyzed. A typical sample 28 comprises radioactive constituents 29 of interest labelled with a radioactive substance (denoted as an "*"), and the plastic scintillator converts the radiation energy 31 into light energy or scintillations 33 when the plastic scintillator is exposed to the sample 28. As part of the analysis, a scintillation counter 30 detects the scintillations from the plastic scintillator 24.

The microplate 24 can perform scintillation counting on wet or dry samples. FIG. 2a shows a wet sample 28 in which the constituents 29 of interest are in the liquid medium. In such a sample, it is preferable that a relatively higher energy radioactive substance, such as $I_{125}$, is used as the radioactive label for the constituents 29 of interest so that the radiation energy 31 is sure to reach the plastic scintillator 24 through the liquid medium.

Figure 2B:
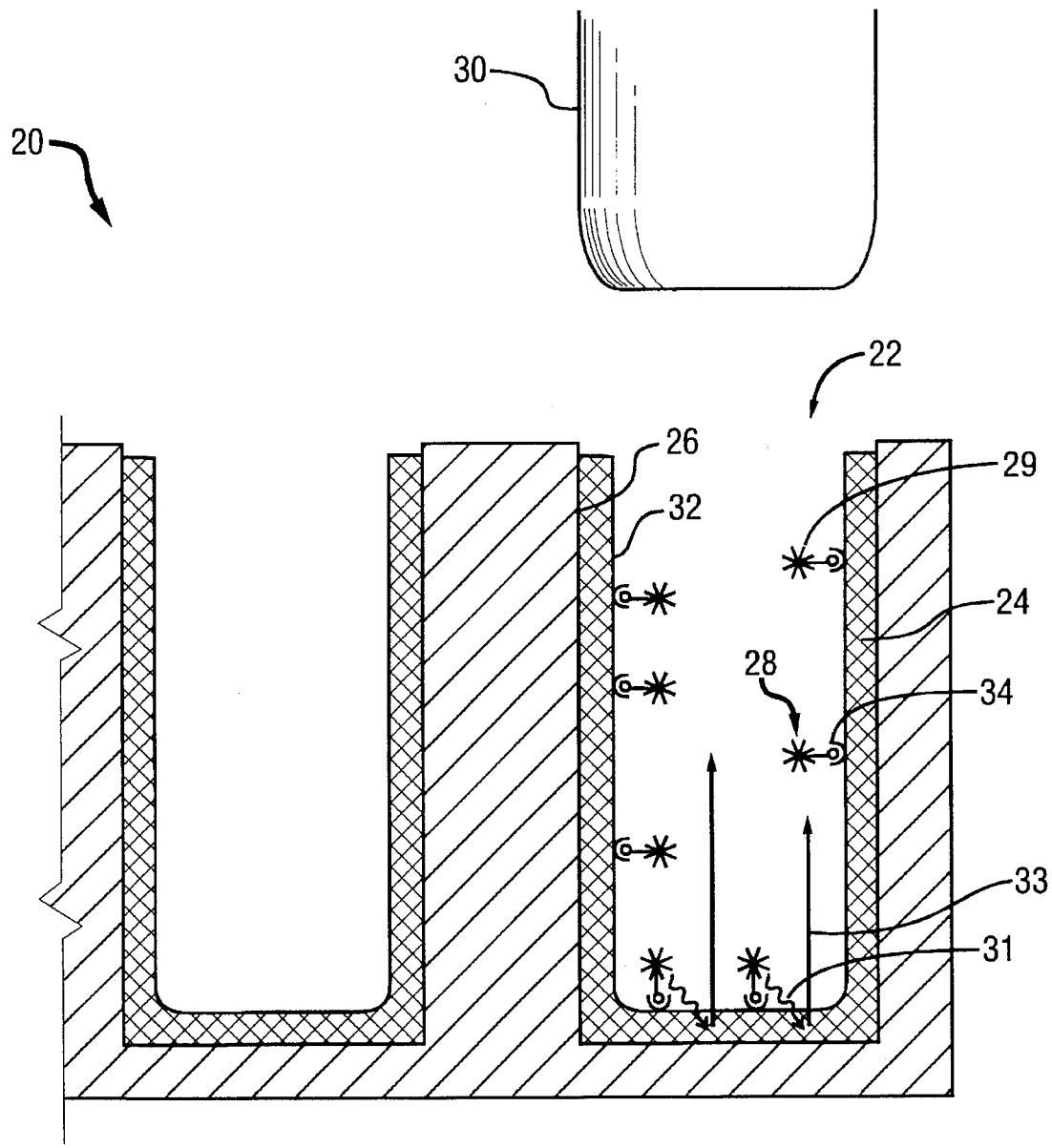

Furthermore, the surface 32 of the plastic scintillator is a good site for the attachment of receptors or antibodies to perform proximity assays with radio-labelled ligands. As shown in FIG. 2b, receptors 34 can be attached to the surface 32, and the receptors 34 would bond with the radio-labelled ligands 29 in the sample, thereby bringing the radio-labelled ligands 29 in close proximity to the plastic scintillator 24. Once the radio-labelled ligands 29 are bond to the plastic scintillator 24, the liquid medium can be removed from the wells 22 as shown in FIG. 2b, thereby enabling dry counting of the scintillators from the plastic scintillator 24.

The scintillations of both FIGS. 2a and 2b are not totally internally reflected within the microplate 20 to propagate along the microplate 20 for detection at one end of the microplate 20. Such a detection scheme for the scintillating microplate 20 could cause "cross-talk" between the different samples 28 in the sample wells 22. Accordingly, in this particular embodiment, the light energy diffuses from the surface of the plastic scintillator, and the emitted light should remain within the confines of each individual well 22 for optimum performance.

The microplate 20 of FIGS. 2a and 2b can be made from a variety of materials having a variety of optical characteristics, including different colors and opaqueness. In the microplate 20, the support surfaces for the plastic scintillator 24 are preferably opaque to prevent "cross-talk" between the sample wells 22. The plastic scintillator 24 can adhere to various surfaces without permeating the generally non-permeable solid support medium, thereby forming a distinct layer between the solid support medium 20 and the sample 28 to be analyzed.

The solid coating 24 remains fixed to the microplate surface 26 as a solid, thereby enabling the microplate to be re-used. The plastic scintillator 24 of the present invention forms a relatively distinct, hard surface 32 which is exposed to the sample 28. The sample 24 contacts the hard surface 32 without permeating the generally non-permeable surface 32 of the plastic scintillator 24. As previously stated, where the plastic scintillator is attached to the surface 21, the plastic scintillator 24 forms a distinct layer between the sample medium and the sample 28. In a particular embodiment, the plastic scintillator layer is within the range of 16–50 microns on the vertical wall of an individual well and 15–80 microns on the base of an individual well.

The plastic scintillator 24 forms a relatively hard, distinct surface 32 which is distinguishable from the soft, non-distinct surface of scintillators that are used to impregnate sorption sheets. These scintillators generally form a crystalline structure that would not stick to the walls of the microplates. Such scintillators produce a very fragile, powdery, flaky end product. These scintillators are used with different methods of sample analysis that include melting the plastic scintillator to surround the sample with a mobile scintillator. As such, the low melting point properties of these scintillators are beneficial, and having the surface characteristics and adhesive nature of the plastic scintillator of the present invention would be detrimental. For example, the adhesive plastic scintillator would not be used to impregnate a typical sorption sheet for use as a filter because the adhesive plastic scintillator, applied to a sorption sheet, would form a sorption sheet with an impermeable layer of plastic scintillator.

The solid plastic scintillator of the present invention is attached to the scintillating solid support before any samples are introduced and remains fixed on the scintillating solid support, thereby enabling the potential re-use of the microplate. Thus, the surface characteristics and the adhesive nature of the solid plastic scintillator coating are essential to the present invention in forming a fixed, durable layer of plastic scintillator.

Figure 3A:
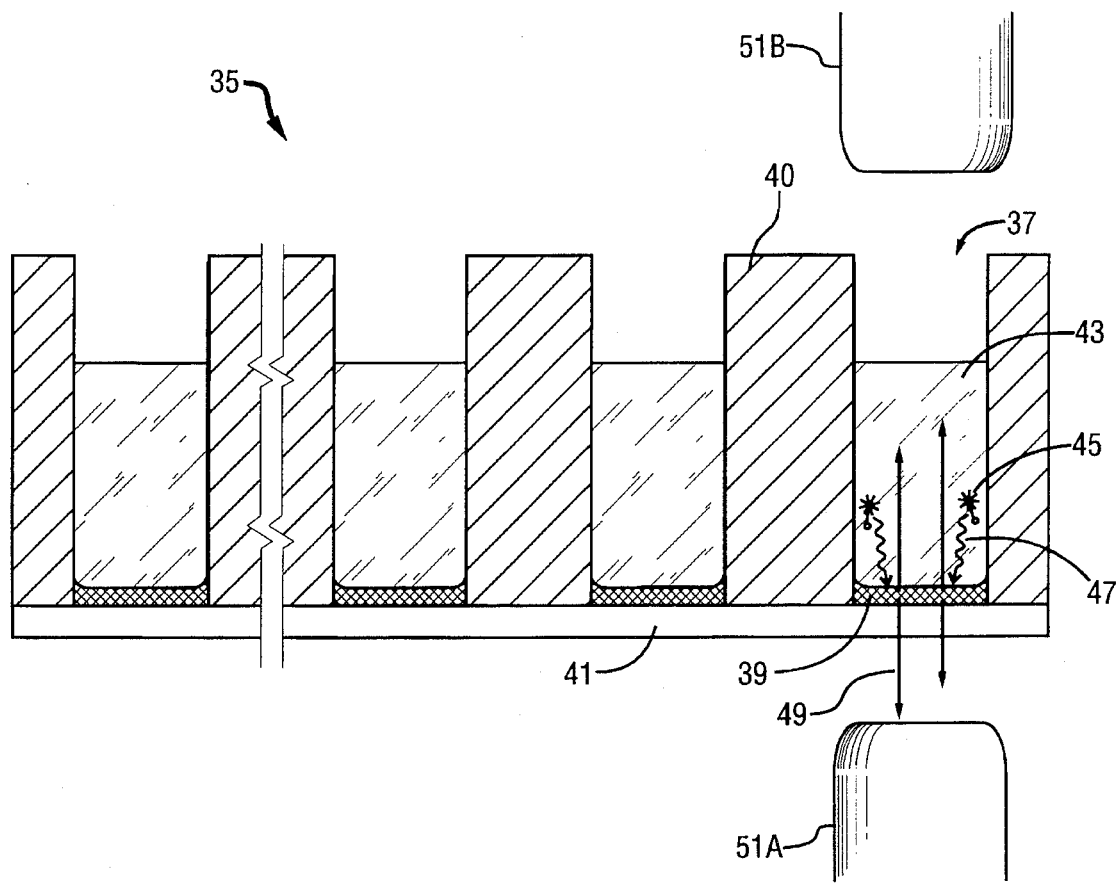
FIGS. 3a and 3b show an adhesive plastic scintillator coating that has been attached to the inside surfaces of sample wells of another type of microtiter plate before the introduction of samples to be analyzed according to the principles of the present invention.
Figure 3B:
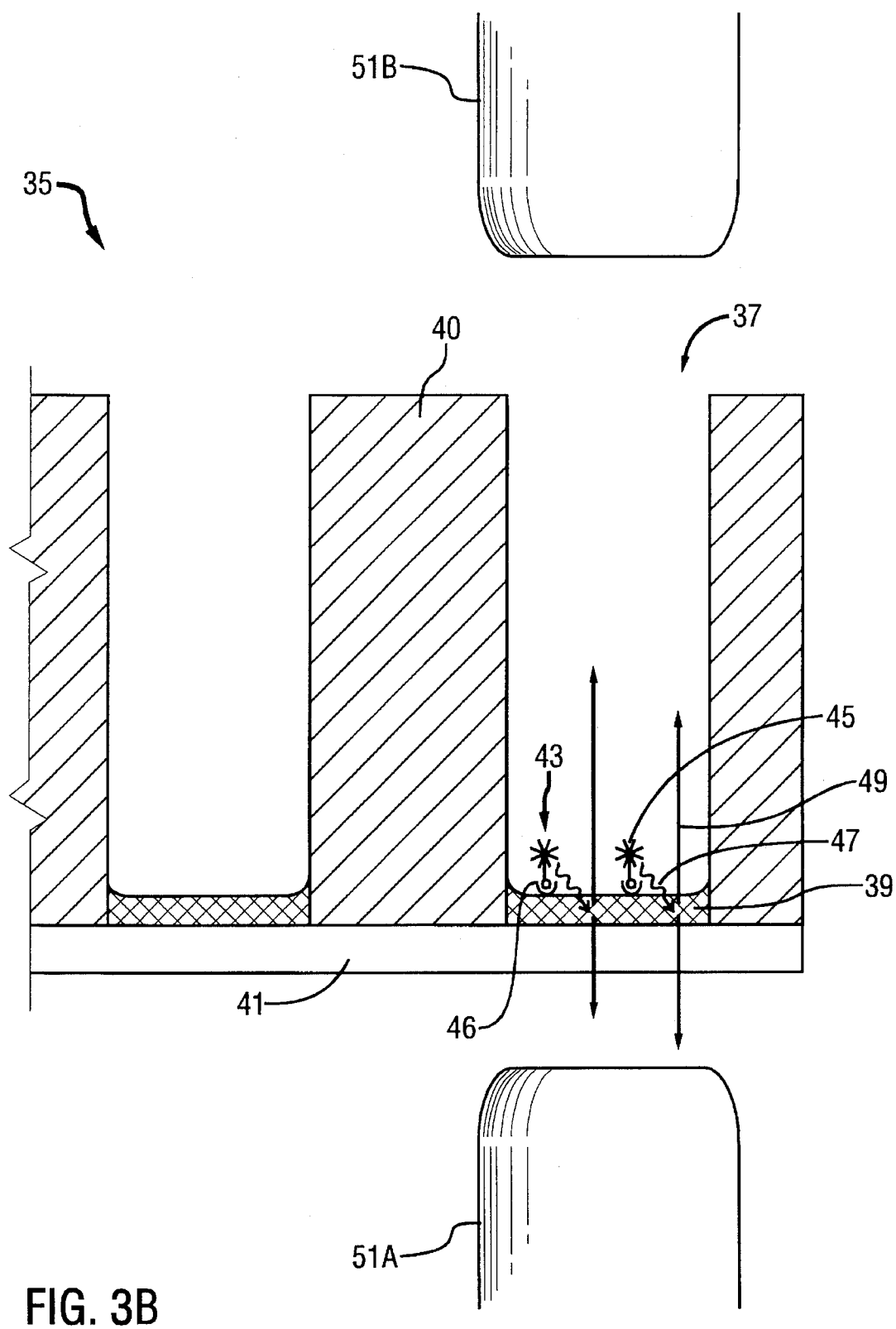

FIGS. 3a and 3b show a microplate 35 having a plurality of sample wells 37 with a solid plastic scintillator coating 39 attached to at least portions of the transparent bottom 41 of the microplate 35. The walls 40 of the microplate 35 are opaque to prevent cross-talk between the sample wells 37. As described for the microplate 20 (FIGS. 2a and 2b), the solid scintillator coating 39 is attached to the microplate 20 before the sample 43 is introduced into the sample well 37. A typical sample 43 comprises radioactive constituents 45, and the plastic scintillator 39 converts the radiation energy 47 into light energy 49. FIG. 3a shows a wet counting arrangement as described in FIG. 2a, and FIG. 3b shows a dry counting arrangement as described for FIG. 2b. A scintillation counter 51a or 51b can be positioned at the bottom or top of the sample well 37 to detect scintillators 49 from the transparent plastic scintillator 39. Scintillation counters 51a and 51b can also be positioned at the top of the sample well 37 or at both locations for coincidence counting arrangements. Again, the scintillations should not be internally reflected within the bottom 41 to propagate along the bottom for detection at one end.

The plastic scintillator, the scintillating solid support medium, and the methods of producing them are illustrated in the following examples, where parts are by weight unless otherwise indicated. However, the invention is not to be considered as limited thereto.

EXAMPLE 1

The preferred embodiment is made by a straightforward melting, mixing and cooling process. To 100 gms of plastic (Piccotex 75) is added 0.9 gms 2,5-diphenyl oxazole (PPO) and 0.1 g bis(methylstyryl)-benzene (bis-MSB). This mixture is heated at 110° C.–120° C. for 1 hour. When the plastic melt has formed it is mixed thoroughly to ensure complete homogeneity. After mixing the plastic melt is cooled to ambient temperature and then broken down to a fine white powder. This procedure produces the plastic scintillator.

EXAMPLE 2

The plastic scintillator powder produced by the process disclosed in Example 1 is weighed into the wells of a polystyrene microplate. The polystyrene microplate is of the 96 well configuration and 50 mgm are weighed into each well. A Dynatech Microfluor 96 well plate obtained from Dynatech (USA) was used. This plate is made of polystyrene and is stable up to 85° C. After dispensing the plastic scintillator into each well the plate is heated at 80° C. for 1 hour and then cooled to ambient temperature.

EXAMPLE 3

To 90 gms plastic (Piccotex 75) is added 10 gms 2,6-diisopropylnaphthalene, 0.9 gms 2,5-diphenyloxazole and 0.1 gms bis-(methylstyryl)benzene (bis-MSB). This mixture is heated at 110° C.–120° C. for 1 hour. When the plastic melt has formed it is mixed thoroughly to ensure complete homogeneity. After mixing, the plastic melt is cooled to ambient temperature and then broken down to a fine white powder. This procedure produces the plastic scintillator containing the optional energy transfer compound. This plastic scintillator can be processed by the process disclosed in Example 2.

EXAMPLE 4

The plastic scintillator produced by the process disclosed in Example 1 can be heated to a plastic melt and used to replace the liquid or solid scintillator used in some large detectors. Upon cooling to ambient temperature the large detector is now allowed a greater degree of positional orientation than is possible with a liquid scintillator. A pourable plastic melt offers advantages over a cast or machined solid plastic scintillator.

EXAMPLE 5

To 61.4 gms plastic (Piccotex 75) is added 0.31 gms 2,5-diphenyloxazole, 0.06 gms bis-(methylstyryl)benzene and 38.25 gms n-heptane. This mixture is stirred at room temperature until all the components have dissolved. This procedure produces a plastic scintillator solution containing fluorescent agents.

EXAMPLE 6

The plastic scintillator solution produced by the process disclosed in Example 5 is dispensed into the wells of a polystyrene microplate which is of the 96 well configuration. Each well is filled with approximately 250 µl of plastic scintillator solution and then emptied again. The residual layer which adheres to the inner surface of the wells is allowed to stand for 2 hours at ambient temperature (20° C.) during which time the solvent evaporates. The final traces of solvent are removed by further heating at 40° C. for a further 2–4 hours.

The invention has been defined in detail with particular reference to certain embodiments thereof, but it will be understood that variations and modifications can be effected within the spirit and scope of the invention.

I claim:

1. A scintillating solid support system for analyzing a sample comprising a sample to be analyzed and a solid coating of a plastic scintillator which is bonded to an impermeable solid support medium, said plastic scintillator including a thermoplastic polymer and a fluorescent agent for converting radiation energy from said sample to be analyzed into light energy which is not internally reflected within said solid support medium to propagate through said solid support medium for detection, said solid coating of plastic scintillator having a first and second surface, said coating bonds to said solid support medium along said first surface, said second surface is exposed to said sample, and said solid coating forms a distinct layer of plastic scintillator between said solid support medium and said sample to be analyzed for detecting light energy converted by said solid coating from radiation energy from said sample.

2. The scintillating solid support system as set forth in claim 1 wherein said thermoplastic polymer is styrene polymer, alpha-methylstyrene polymer or alpha-methylstyrene/vinyltoluene copolymer.

3. The scintillating solid support system as set forth in claim 1 wherein said plastic scintillator comprises an energy transfer compound added to enhance the scintillation properties.

4. The scintillating solid support system as set forth in claim 1 wherein said plastic scintillator solidifies at room temperature and is meltable at a temperature that does not deform said solid support medium.

5. The scintillating solid support system as set forth in claim 1 wherein said plastic scintillator is transparent.

6. The scintillating solid support system as set forth in claim 1 wherein said plastic scintillator is deposited on said solid support medium in a liquid solution with a solvent, and said solvent is evaporated off to form said plastic scintillator.

7. A scintillating solid support system comprising a sample to be analyzed and a plastic scintillator which is deposited as a liquid on an impermeable solid support medium and bonded to said solid support medium as a solid coating, said plastic scintillator including a thermoplastic polymer and a fluorescent agent for converting radiation energy from a sample exposed to said plastic scintillator into light energy which is not internally reflected within said solid support medium for transmission along said solid support medium for detection, said solid coating of plastic scintillator having a first and second surface, said coating bonds to said solid support medium along said first surface, said second surface is exposed to said sample, and said solid coating forms a distinct layer of plastic scintillator between said solid support medium and said sample to be analyzed for detecting light energy converted by said solid coating from radiation energy from said sample.

8. A scintillating solid support system comprising a sample to be analyzed and a plastic scintillator which is deposited as a liquid on a solid support medium and bonded to said solid support medium as a solid coating, said plastic scintillator including a thermoplastic polymer and a fluorescent agent for converting radioactive energy from a sample exposed to said plastic scintillator into light energy which is not internally reflected within said solid support medium for transmission along said solid support medium for detection, said solid coating of plastic scintillator having a first and second surface, said coating bonds to said solid support medium along said first surface, said second surface is exposed to said sample, and said solid coating forms a distinct, impermeable layer of plastic scintillator between said solid support medium and said sample to be analyzed for detecting light energy converted by said solid coating from radiation energy from said sample.

9. The scintillating solid support system as set forth in claim 8, wherein said solid support medium is impermeable.

10. A method of preparing a scintillating solid support system for analyzing a sample, comprising the steps of: heating a plastic scintillator to a temperature not lower than the melting point thereof, said plastic scintillator comprising a thermoplastic polymer and a fluorescent agent for converting radiation energy from a sample exposed to said solid support medium into light energy which is not internally reflected within said solid support medium to propagate through said solid support medium for detection; applying said molten plastic scintillator to the solid support medium; cooling said plastic scintillator so that said plastic scintillator forms a solid coating which bonds to said solid support medium; exposing said solid coating of plastic scintillator to said sample; and maintaining said solid coating of plastic scintillator solid as a distinct layer of plastic scintillator between said solid support medium and said sample.

11. A method of preparing a scintillating solid support system for analyzing a sample, comprising the steps of: dissolving a plastic scintillator in a suitable solvent medium, said plastic scintillator comprising a thermoplastic polymer and a fluorescent agent for converting radiation energy from a sample exposed to said solid support medium into light energy which is not internally reflected within said solid support medium to propagate through said solid support medium for detection; adding said plastic scintillator solution to the solid support medium; removing sufficient of said plastic scintillator solution to leave a residual coating on said solid support medium; allowing said residual coating to solidify by evaporation of the solvent and thereby forming a solid layer of plastic scintillator on said solid support medium; exposing said solid layer of plastic scintillator to said sample, said solid layer forming a distinct layer of plastic scintillator between said solid support medium and said sample; and maintaining said layer of plastic scintillator solid.

12. A method of preparing a scintillating solid support system for analyzing a sample, said method comprising the steps of:

depositing a plastic scintillator on a solid support medium as a liquid, said plastic scintillator including a thermoplastic polymer and a fluorescent agent for converting radiation energy from said sample to be analyzed into light energy which is not internally reflected within said solid support medium to propagate along said solid support medium for detection;

forming a solid coating of said plastic scintillator which bonds to said solid support medium;

exposing said solid coating of plastic scintillator to said sample, said solid coating forming a distinct layer of plastic scintillator between said solid support medium and said sample; and maintaining said coating solid.

13. The method of claim 12 wherein said step of depositing includes the step of melting said plastic scintillator and said step of forming a solid coating includes allowing said plastic scintillator to solidify.

14. The method of claim 12 wherein said step of depositing includes the step of preparing a solution of said plastic scintillator in a liquid solvent and said step of forming a solid coating includes evaporating said liquid solvent from said solution.

15. A method of preparing a scintillating solid support system for analyzing a sample, said method comprising depositing a plastic scintillator onto a solid support medium as a liquid, said plastic scintillator comprising a thermoplastic polymer and a fluorescent agent for converting radiation energy from said sample exposed to said plastic scintillator into light energy which is not internally reflected within said solid support medium for transmission along said solid support medium for detection;

forming a solid coating of said plastic scintillator which bonds to said solid support medium;

exposing said solid coating of plastic scintillator to said sample, said solid coating forming a distinct, impermeable layer of plastic scintillator between said solid support medium and said sample; and maintaining said coating solid.

16. The method of preparing a scintillating solid support system as set forth in claim 15, wherein said solid support medium is impermeable.

17. A method of preparing a scintillating solid support system for analyzing a sample, said method comprising depositing a plastic scintillator on a solid support medium as a molten liquid of plastic scintillator, said plastic scintillator including a thermoplastic polymer and a fluorescent agent for converting radioactive energy from a sample to be analyzed into light energy; and forming a solid coating by solidifying said plastic scintillator wherein said plastic scintillator bonds to said solid support medium;

exposing said solid coating of plastic scintillator to said sample, said solid coating forming a distinct layer of plastic scintillator between said solid support medium and said sample; and maintaining said coating solid.

18. A microplate forming a multiplicity of sample wells for holding samples to be assayed, each of said sample wells comprising a solid coating of a plastic scintillator bonded to at least a portion of an inside surface of said sample wells, said portion of said inside surface is impermeable to said plastic scintillator, said plastic scintillator comprising a thermoplastic polymer and a fluorescent agent for converting radiation energy from samples to be assayed into light energy, said solid coating of plastic scintillator having a first and second surface, said coating bonds to said portion of said inside surface of said sample wells along said first surface, said second surface is exposed to said samples, and said solid coating forms a distinct layer of plastic scintillator between said portion of said inside surface of said sample wells and said samples to be assayed.

19. The microplate of claim 18 wherein said microplate is opaque.

20. A microplate forming a multiplicity of sample wells for holding samples to be assayed, each of said sample wells comprising a solid coating of a plastic scintillator bonded to at least a portion of an inside surface of said sample wells, said plastic scintillator comprising a thermoplastic polymer and a fluorescent agent for converting radioactive energy from samples to be assayed into light energy, said solid coating of plastic scintillator having a first and second surface, said coating bonds to said portion of said inside surface of said sample wells along said first surface, said second surface is exposed to said samples, and said solid coating forms a distinct, impermeable layer of plastic scintillator between said portion of said inside surface of said sample wells and said samples to be assayed.

21. A method of preparing a microplate forming a multiplicity of sample wells for holding samples to be assayed, said method comprising:

preparing a solution of a plastic scintillator in a liquid solvent, said plastic scintillator comprising a thermoplastic polymer and a fluorescent agent for converting radiation energy from sample to be assayed into light energy;

at least partially filling the sample wells with said solution, and then removing the solution from said wells to leave a residual coating of the solution the inside surface of the sample wells which has been in contact with said solution, evaporating the liquid solvent from the residual coating on said inside surface of the sample wells to leave a solid layer of plastic scintillator, exposing said solid layer of plastic scintillator to said samples to be assayed, and maintaining said solid layer on said inside surface of the sample wells solid, said solid layer on said inside surface of the sample wells forming a distinct layer between said inside surface and said samples.

22. A method of preparing a microplate forming a multiplicity of sample wells for holding samples to be assayed, said method comprising:

preparing a solution of a plastic scintillator in a liquid solvent, said plastic scintillator comprising a thermoplastic polymer and a fluorescent agent for converting radioactive energy from a sample to be assayed into light energy;

at least partially filling the sample wells with said solution, and then removing the solution from said wells to leave a residual coating of the solution on the inside surface of the sample wells which has been in contact with said solution, evaporating the liquid solvent from the residual coating on said inside surface of the sample wells to leave a solid layer of plastic scintillator, exposing said solid layer of plastic scintillator to said samples to be assayed, and maintaining said solid layer on said inside surface of the sample wells solid, said solid layer on said inside surface of the sample wells form a distinct, impermeable layer between said inside surface and said samples.

23. The method of preparing a microplate as set forth in claim 22, wherein said inside surface is impermeable to said plastic scintillator.

\* \* \* \* \*